(12) United States Patent
Chon et al.

(10) Patent No.: US 7,157,856 B2
(45) Date of Patent: Jan. 2, 2007

(54) APPARATUS AND METHOD FOR CONTROLLING HEADLIGHT IN VEHICLE AND HEADLIGHT LAMP HAVING MULTIFUNCTION STRUCTURE

(76) Inventors: Young-Ill Chon, 106-103 Haenuri-Kunkyung Apartment 1361-1, Ssangyong 2-dong, Cheonan-si, Chungcheongnam-do (KR) 330-760; Sang-Wook Chon, 106-103 Haenuri-Kunkyung Apartment 1361-1, Ssangyong 2-dong, Cheonan-si, Chungcheongnam-do (KR) 330-760

( * ) Notice: Subject to any disclaimer, the term of this patent is extended or adjusted under 35 U.S.C. 154(b) by 0 days.

(21) Appl. No.: 10/509,433

(22) PCT Filed: Nov. 11, 2003

(86) PCT No.: PCT/KR03/02420

§ 371 (c)(1),
(2), (4) Date: Sep. 27, 2004

(87) PCT Pub. No.: WO2004/044945

PCT Pub. Date: May 27, 2004

(65) Prior Publication Data

US 2005/0141232 A1 Jun. 30, 2005

(30) Foreign Application Priority Data

Nov. 11, 2002 (KR) .................... 10-2002-0069678

(51) Int. Cl.
*H05B 37/02* (2006.01)

(52) U.S. Cl. .................. 315/82; 315/156; 315/159; 307/10.8

(58) Field of Classification Search ............... 315/82, 315/156, 159; 307/10.8
See application file for complete search history.

(56) References Cited

U.S. PATENT DOCUMENTS 5,998,929 A * 12/1999 Bechtel et al. .............. 315/82
6,049,171 A * 4/2000 Stam et al. .................. 315/82

* cited by examiner

*Primary Examiner*—David Vu
(74) *Attorney, Agent, or Firm*—patenttm.us; James H. Walters

(57) ABSTRACT

The present invention relates to a headlight lamp (110) having a multifunction structure in which a lighting angle of a headlight of a vehicle is automatically and manually controlled based on a running speed of a vehicle, a brightness of a headlight of an opponent vehicle and a surrounding brightness of a vehicle. The headlight lamp (110) includes a plurality of high angle headlight filaments (115), capable of lighting for providing a high angle beam to a vehicle, a plurality of low angle headlight filaments (111) capable of lighting for providing a low angle beam to the vehicle, low angle headlight reflection covers (112) provided in the low angle headlight filaments (111) respectively, for thereby allowing the light from the low angle headlight filaments (111) to have a low beam pattern angle, and external connection terminals.

15 Claims, 8 Drawing Sheets

APPARATUS AND METHOD FOR CONTROLLING HEADLIGHT IN VEHICLE AND HEADLIGHT LAMP HAVING MULTIFUNCTION STRUCTURE

TECHNICAL FIELD

The present invention relates to a headlight of a vehicle, and in particular to a headlight lamp having a multifunction structure in which a lighting angle of a headlight of a vehicle is automatically and manually controlled based on a running speed of a vehicle, a brightness of a headlight of an opponent vehicle and a surrounding brightness of a vehicle using a headlight lamp having a multifunction structure provided with a plurality of filaments for high, middle and low angle headlights. There is provided a disconnection prevention structure having a plurality of filaments for a disconnection of a filament of a headlight lamp. There is provided a headlight having a sufficient luminous intensity capable of implementing a sufficient sight distance for overcoming a problem that a driver's eyesight is bad due to a bad weather such as rain, etc. In addition, the present invention relates to an apparatus and method for controlling a headlight of a vehicle and a headlight lamp having a multifunction structure for automatically providing a steering beam in a certain direction based on a steering direction of a vehicle by providing more than at least one steering headlight filament.

BACKGROUND ART

Generally, a lighting apparatus used for implementing a certain forward eyesight when driving a vehicle in the night or a bad weather condition is classified into a low angle headlight and a high angle headlight. In an integration type headlight, a low angle headlight filament and a high angle headlight filament are integrally formed in one lamp, and in a separation type headlight, a low angle headlight lamp and a high angle headlight lamp are separately formed in one lamp. The integration and separation type headlights each include one low angle headlight filament and one high angle headlight filament in one lamp, respectively. The on and off operation is simply performed in such a manner that beam is lighted with a fixed luminous intensity and at a high and low lighting angle based on a switch operation by a driver.

According to the Korea Standard (KS) and a vehicle safety standard, the headlight has a beam luminous intensity from above 15000 cd (candela) to 125000 cd in maximum. The concurrently turned-on integration type conversion beams have a luminous intensity in a range from 12000 cd in minimum to 120000 cd in maximum. According to a vehicle lighting safety standard, a maximum lighting distance is within 15 m in a forward direction, and a low beam is within 10 m. With the above standard, it should be possible to perceive and check a certain obstacle in a lighting range.

At an initial stage, the headlight is formed of lens, bulb, and reflection mirror. Recently, a shield beam bulb formed in an integration type is generally used. A high and low angle headlight integration type headlight or a high headlight and low headlight are provided in a separation type in a pair in the left and right sides, respectively. In the above high and low angle headlight integration type headlight, a low angle headlight filament and a high angle headlight filament used for a headlight of a conventional vehicle are integrally formed in one lamp.

The lamp of the headlight is formed of an alloy filament that is formed of tungsten and molybdenum as a main material and is mixed with a metallic material having a low resistance ratio for the purpose of preventing a power loss by decreasing a load of heating material, increasing brightness and extending a life span by preventing an oxidation of filament. In the conventional art, a space layer between a filament and an outer glass wall is formed of a vacuum layer. Recently, a load resistance of current is increased by injecting an alternative gas into a vacuum layer, so that a heating efficiency of a filament is increased, and a lighting light is increased.

In the integration type and separation type, the headlight of vehicle is separated into an opponent beam (capable of preventing dazzling by an opponent vehicle in such a manner that an optical axis is oriented in a lower direction, namely, a low headlight), and a running beam (in which an optical axis is lighted far in a horizontal direction, namely, a high angle (or horizontal) headlight).

According to the vehicle luminous intensity safety standard law, the headlight of a conventional vehicle has a lighting luminous intensity difference more than at least 10 times based on the kinds of vehicles and a design performance. The headlight is designed to light at a uniform luminous intensity and a fixed lighting angle based on a night eyesight of a driver who has a good health for thereby easily recognizing an existence of obstacle or a movement based on a good road condition. Therefore, the driving apparatus of a headlight of a vehicle is designed to light only an opponent direction beam capable of lighting a low angle beam or a high angle beam or a running beam capable of concurrently lighting a high and low angle beam based on a switch operation of a headlight by a driver.

Since the headlight is used for obtaining a certain forward visual field during the night or bad weather driving, the headlight is a very important apparatus for a vehicle.

In a conventional art, there is a difference more than 10 times in a performance based on a design in a headlight having a common vacuum lamp, halogen lamp and HID (High Intensity Discharge) lamp that are formed in a fixed luminous intensity structure or a fixed angle lighting structure. The conventional headlight is designed to light at the same luminous intensity even when a driver drives in a rainy night or on a sequestered road in which it is impossible to obtain a satisfied luminous intensity for a forward direction clean visual field and even when a driver who has a night blindness drives during the night.

Therefore, in the above state, since a driver drives based on a sensitive method, not based on a visual field method, there may be a serious accident in safety driving of a vehicle.

The stop distance of a running vehicle is determined by summing a perception reaction distance (needed for a driver to perceive a certain danger, and a brake starts to operate) and a braking distance (needed for a vehicle to stop after a brake starts operating). The headlight of vehicle should be designed to light during at least stop distance based on the speed of a vehicle.

For example, in the case that a vehicle runs at 20 km/h, the stop distance is 9 m by summing the perception reaction distance of 6 m and the braking distance of 3 m, and in the case that the vehicle runs at 40 km/h, the stop distance is 22 m by summing the perception reaction distance of 11 m and the is braking distance of 11 m, and in the case that the vehicle runs at 60 km/h, the stop distance is 44 m (perception reaction distance of 17 m+braking distance of 27 m), and in the case that the vehicle runs at 80 km/h, the stop distance is 76 m (perception reaction distance of 22 m+braking distance of 54 m), and in the case that the vehicle runs at 100 km/h, the stop distance is 112 m (perception reaction distance of 28 m+braking distance of 84 m).

In addition, in a reaction processing procedure of the sudden braking needed after a driver perceives a certain dangerous situation, the reflection time (required to react with a sound of "O My!") is 0.7~0.8 seconds in the case of the sudden braking, and the reaction time is 2.5~3.0 seconds in the common braking operation. The conventional low angle headlight is designed without considering the stop distance based on the speed and the reaction time based on the sudden braking. Namely, the conventional low angle headlight is formed in a fixed type structure capable of only lighting an area within a forward 15 m range with a fixed luminous intensity.

Therefore, in the case of a vehicle having a HID lamp when the vehicle runs in an area having a bright surrounding, the headlight has over luminous intensity, so that the power is unnecessarily consumed. In the case that a driver drives a vehicle during a bad weather in which a visual field is very limited in a rainy night or a driver having a night blindness drives a vehicle having a vacuum lamp or halogen lamp, it is impossible to obtain a proper brightness for a safety driving. Even when the headlight is turned on, the forward concentration of the driver is decreased.

In addition, the conventional low angle headlight is designed to have a main observing point of a forward 15 m distance. Therefore, when the vehicle runs at an economical speed of 60 km/h with a stop distance of 44 m (perception reaction distance of 17 m+braking distance of 27 m) and at a speed of 80 km with a stop distance of 76 m (perception reaction distance of 22 m+braking distance of 54 m), since it is impossible to perceive a certain thing existing within a stop distance, even when the headlight is turned on, it is impossible to perceive a forward obstacle within a stop distance and a reaction time based on a sensitive driving for thereby directly causing a traffic accident.

In the conventional vehicle, when the vehicle turns left or right in the night, since the headlight does not light along the intended turning direction, it is impossible for a driver to perceive a certain obstacle during the turning operation, so that there is a serious problem for implementing a safety driving.

In addition, in the case that the low angle headlight filament generally used for the headlight is disconnected, there is not a proper method for overcoming the problem during the driving. In this case, there is an inconvenient problem when exchanging the headlight. A certain danger may occur due to the lost of the lighting function.

DISCLOSURE OF INVENTION

Accordingly, it is an object of the present invention to provide an apparatus and method for controlling a headlight in a vehicle and a headlight lamp having a multifunction structure which are capable of overcoming the problems encountered in the conventional art and are capable of adjusting a luminous intensity in multiple steps from a reference luminous intensity step based on a night visual field perception degree that a driver perceives in a state that a headlight is turned on and based on a weather condition of a road on which a vehicle runs and capable of adjusting a luminous intensity of headlight in maximum with respect to an increase and decrease complying with the safety standard law.

It is another object of the present invention to provide an apparatus and method for controlling a headlight of a vehicle and a headlight lamp having a multifunction structure that are capable of automatically adjusting a lighting angle of a headlight in proportion to a running speed of a vehicle and capable of automatically adjusting a luminous intensity and lighting angle of a headlight in proportion to a luminous intensity of an opponent vehicle headlight and a vehicle surrounding luminous intensity.

It is further object of the present invention to provide an apparatus and method for controlling a headlight of a vehicle and a headlight lamp having a multifunction structure that are capable of lighting in a running direction of a vehicle even when a vehicle changes its running direction.

It is still further object of the present invention to provide an apparatus and method for controlling a headlight of a vehicle and a headlight lamp having a multifunction structure that have a headlight disconnection extra-structure and a disconnection recovering program by which a lamp of a headlight is stably operated even when a filament of a headlight lamp is disconnected.

To achieve the above objects, in a headlight lamp 100 adapted in a headlight for a vehicle, there is provided a headlight lamp having a multifunction structure, comprising a plurality of high angle headlight filaments 115, 125 capable of lighting for providing a high angle beam to a vehicle, a plurality of low angle headlight filaments 111, 121 capable of lighting for providing a low angle beam to the vehicle, low angle headlight reflection covers 112, 122 provided in the low angle headlight filaments 111, 121, respectively, for thereby allowing the light from the low angle headlight filaments 111, 121 to have a low beam pattern angle, and external connection terminals 118, 128 corresponding to the high and low angle headlight filaments 115/125, 111/121, respectively.

There are further provided a plurality of middle angle headlight filaments 113, 123 capable of providing a middle angle beam to the vehicle, middle angle headlight reflection covers 114, 124 provided in the middle angle headlight filaments 113, 123, respectively, for thereby allowing the light from the middle headlight filaments 113, 123 to have a middle beam pattern angle, and external connection terminals 118, 128 corresponding to the middle angle headlight filaments 113, 123, respectively.

There are further provided more than at least one steering headlight filament 117, 127 providing a steering beam in one direction between left and right directions to the vehicle, steering headlight reflection covers 116, 126 provided in the steering headlight filaments 117, 127, respectively, for thereby allowing the light from the steering headlight filaments 117, 127 to have a steering beam pattern angle, and external connection terminals 118, 128 corresponding to each of more than at least one steering headlight filament 117, 127, respectively.

To achieve the above objects, in a headlight lamp 200 adapted in a headlight for a vehicle, there is provided a headlight lamp having a multifunction structure, comprising a plurality of high angle headlight lamps 210*b*, 220*b* each formed of a plurality of high angle headlight filaments 215, 225, and external connection terminals 218*b*, 228*b* corresponding to the high angle headlight filaments 215, 225 for thereby providing a high angle beam to the vehicle, and a plurality of low angle headlight lamps 210*a*, 220*a* each including a plurality of low angle headlight filaments 211, 221, a plurality of low angle headlight reflection covers 212, 222 provided in the low angle headlight filaments 211, 221, and a plurality of external connection terminals 218*a*, 228*a* corresponding to the low angle headlight filaments 211, 221, for thereby providing a low angle beam to the vehicle.

The high angle headlight lamps 210b, 220b each include more than at least one steering headlight filament 217b, 227b capable of emitting light for providing a steering beam to the vehicle, steering headlight reflection covers 216b, 226b provided in the steering headlight filaments 217b, 227b for allowing the light from the steering headlight filaments 217b, 227b to have a steering beam pattern angle, and external connection terminals 218b, 228b corresponding to the steering headlight filaments 217b, 227b, respectively.

The low angle headlight lamps 210a, 220a each include more than at least one steering headlight filament 217a, 227a capable of emitting light for providing a steering beam to the vehicle, steering headlight reflection covers 216a, 226a provided in the steering headlight filaments 217a, 227a for allowing the light from the steering headlight filament 217a, 227a to have a steering beam pattern angle, and external connection terminals 218a, 228a corresponding to the steering headlight filaments 217a, 227a, respectively.

The high angle headlight lamps 210b, 220b each include more than at least one middle headlight filament 213b, 223b capable of emitting light for providing a middle angle beam to the vehicle, middle angle headlight reflection covers 214b, 224b provided in the middle headlight filaments 213b, 223b for allowing the light from the middle angle headlight filaments 213b, 223b to have a middle angle beam pattern angle, and external connection terminals 218b, 228b corresponding to the middle steering headlight filaments 213b, 223b, respectively.

The low angle headlight lamps 210a, 220a each include more than at least one middle angle headlight filament 213a, 223a capable of emitting light for providing a middle angle beam to the vehicle, middle angle headlight reflection covers 214a, 224a provided in the middle headlight filaments 213a, 223a for allowing the light from the middle angle headlight filaments 213a, 223a to have a middle angle beam pattern angle, and external connection terminals 218a, 228a corresponding to the middle angle headlight filaments 213a, 223a, respectively.

To achieve the above objects, in an apparatus for controlling a headlight for a vehicle having a headlight lamp of a multifunction structure having a plurality of high, middle and low angle headlight filaments 115/125, 113/123, 111/121, 117/127 each capable of emitting light for providing high, middle and low angle steering beams, there is provided an apparatus for controlling a headlight for a vehicle, comprising a light switch 20 capable of providing an automatic mode to a vehicle driver, the automatic mode capable of automatically changing an on and off time of the headlight 300 and a lighting angle of the headlight 300, a vehicle speed sensor 40 for detecting a running speed of a vehicle when an automatic mode is selected by the light switch 20 and generating a vehicle speed signal corresponding to the detected vehicle speed, an opponent vehicle headlight luminous intensity sensor 60 for detecting a luminous intensity of the opponent vehicle headlight of the vehicle when the automatic mode is selected by the light switch 20 and generating a luminous intensity signal corresponding to the detected opponent vehicle luminous intensity, a vehicle surrounding luminous intensity sensor 50 for detecting a surrounding luminous intensity of the vehicle when the automatic mode is selected by the light switch 20 and generating a luminous intensity signal corresponding to the detected surrounding luminous intensity, a controller 10 for determining a lighting step of the headlight 300 in accordance with a vehicle speed, opponent vehicle headlight luminous intensity signal and vehicle surrounding luminous intensity signal from the vehicle speed sensor 40, the opponent vehicle headlight luminous intensity sensor 60 and the vehicle surrounding luminous intensity sensor 50 and controlling an operation that a corresponding filament among the high, middle and low angle headlight filaments 115/125, 113/123, 111/121 is turned on based on the determined lighting step, a headlight relay unit 80 for supplying a power to a corresponding selected filament based on the determined lighting step among the high, middle and low angle headlight filaments 115/125, 113/123, 111/121 in accordance with a control of the controller, and a power unit 90 for supplying a power to each element of the vehicle.

There are further provided a steering sensor 70 for detecting a steering state of the vehicle and generating a steering signal corresponding to the detected steering direction, a controller 10 for determining a steering direction of the vehicle based on a steering signal from the steering sensor 70 and controlling an operation that the steering headlight filaments 117, 127 of a corresponding direction among the steering headlight filaments 117, 127 is turned on in accordance with the determined steering direction, and a headlight relay unit 80 for supplying a power to the steering headlight filaments 117, 127 of a corresponding direction determined in accordance with the steering signal among the steering headlight filaments 117, 127.

There is further provided a headlight passing switch 30 for turning on a certain filament among the high, middle and low angle headlight filaments 115/125, 113/123, 111/121 based on a driver's operation when the manual mode of the light switch 20 is selected and for lighting a beam having a corresponding angle to the vehicle.

To achieve the above objects, in a method for controlling a headlight of a vehicle using headlight lamps 100, 200 each having a multifunction structure having high, middle, low and steering angle headlight filaments capable of emitting light for providing high, middle, low and steering beams, there is provided a method for controlling a headlight of a vehicle, comprising the steps of a step for performing a headlight automatic mode in such a manner that a vehicle driver adjusts a light switch 20, a step for detecting a running speed of the vehicle by driving a vehicle speed sensor 40, a step for determining a lighting step corresponding to the detected vehicle speed from a vehicle speed signal from the vehicle speed sensor 40, a step for turning on a corresponding filament among the high, middle and low angle headlight filaments in accordance with the determined lighting step, a step for detecting an opponent vehicle headlight luminous intensity of the vehicle by driving an opponent vehicle headlight luminous intensity sensor 60, a step for determining a lighting step corresponding to the detected opponent vehicle headlight luminous intensity from a luminous intensity signal from the opponent vehicle headlight luminous intensity sensor 60, a step for turning on a corresponding filament among the high, middle and low angle headlight filaments in accordance with the determined lighting step, a step for detecting the surrounding luminous intensity of the vehicle by driving a vehicle surrounding luminous intensity sensor 50, a step for determining a lighting step corresponding to the detected vehicle surrounding luminous intensity from a luminous intensity signal from the vehicle surrounding luminous intensity sensor 50, and a step for turning on a corresponding filament among the high, middle, and low angle filament in accordance with the determined lighting step.

There are further provided a step for detecting a steering state of the vehicle by driving a steering sensor 70, a step for determining a steering direction of the vehicle from a steering signal from the steering sensor 70, and a step for turning on a corresponding filament corresponding to the steering direction among the steering headlight filaments in accordance with the determined lighting step.

There are further provided a step for judging whether a corresponding filament is disconnected among the high, middle and low angle headlight filaments in accordance with the determined lighting step in accordance with a vehicle speed signal, an opponent vehicle headlight luminous intensity signal and a vehicle surrounding luminous intensity signal from the vehicle speed sensor 40, an opponent vehicle headlight luminous intensity sensor 60 and a vehicle surrounding luminous intensity sensor 50, a step for substituting the disconnected filament with a previously designated filament when the corresponding filament is disconnected and turning on the filament, and a step for adjusting the current lighting step and alarming a state that the corresponding filament is disconnected.

There are further provided the steps of a step for judging whether there is an input of the headlight passing switch 30 by a vehicle driver, a step for determining the lighting step corresponding to the inputted switch operation when there is an input of the headlight passing switch 30, and a step for turning on a corresponding filament among the high, middle and low angle headlight filaments 115/125, 113/123, 111/121 in accordance with the determined lighting step.

BRIEF DESCRIPTION OF DRAWINGS

The present invention will become better understood with reference to the accompanying drawings which are given only by way of illustration and thus are not limitative of the present invention, wherein.

BEST MODE FOR CARRYING OUT THE INVENTION

Figure 1:
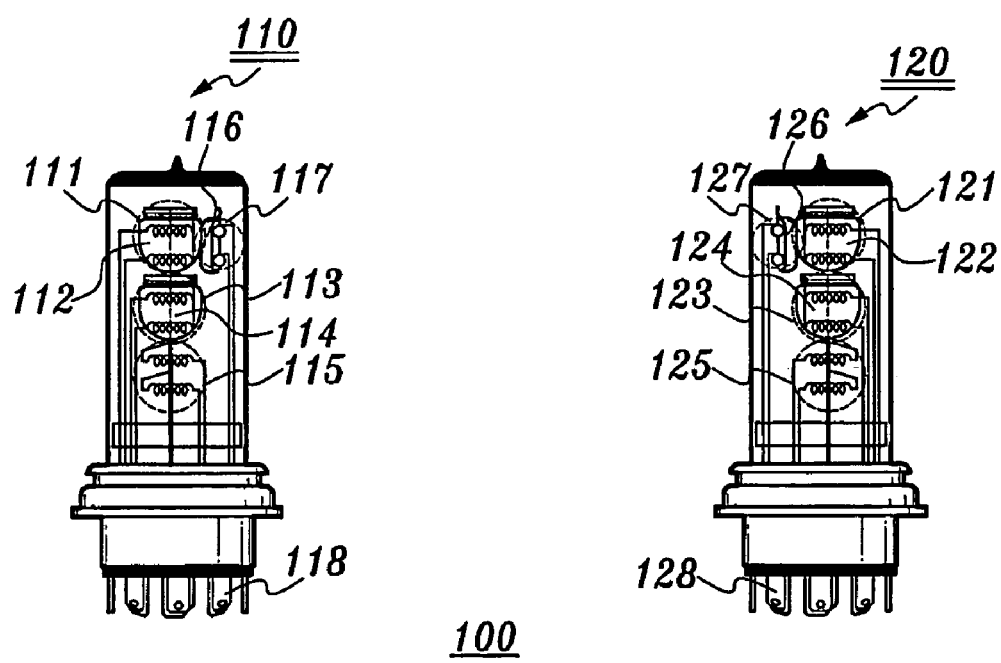
FIG. 1 is a view illustrating an integral type headlight lamp for a vehicle having a multifunction structure according to a preferred embodiment of the present invention.

The preferred embodiments of the present invention will be described with reference to the accompanying drawings. When giving the elements of each drawing a corresponding reference numeral, the same elements are given the same numeral references even through they are shown in different drawings. In addition, the known art functions and construction that are judged to make the gist of the present invention unclear will be omitted.

Figure 2:
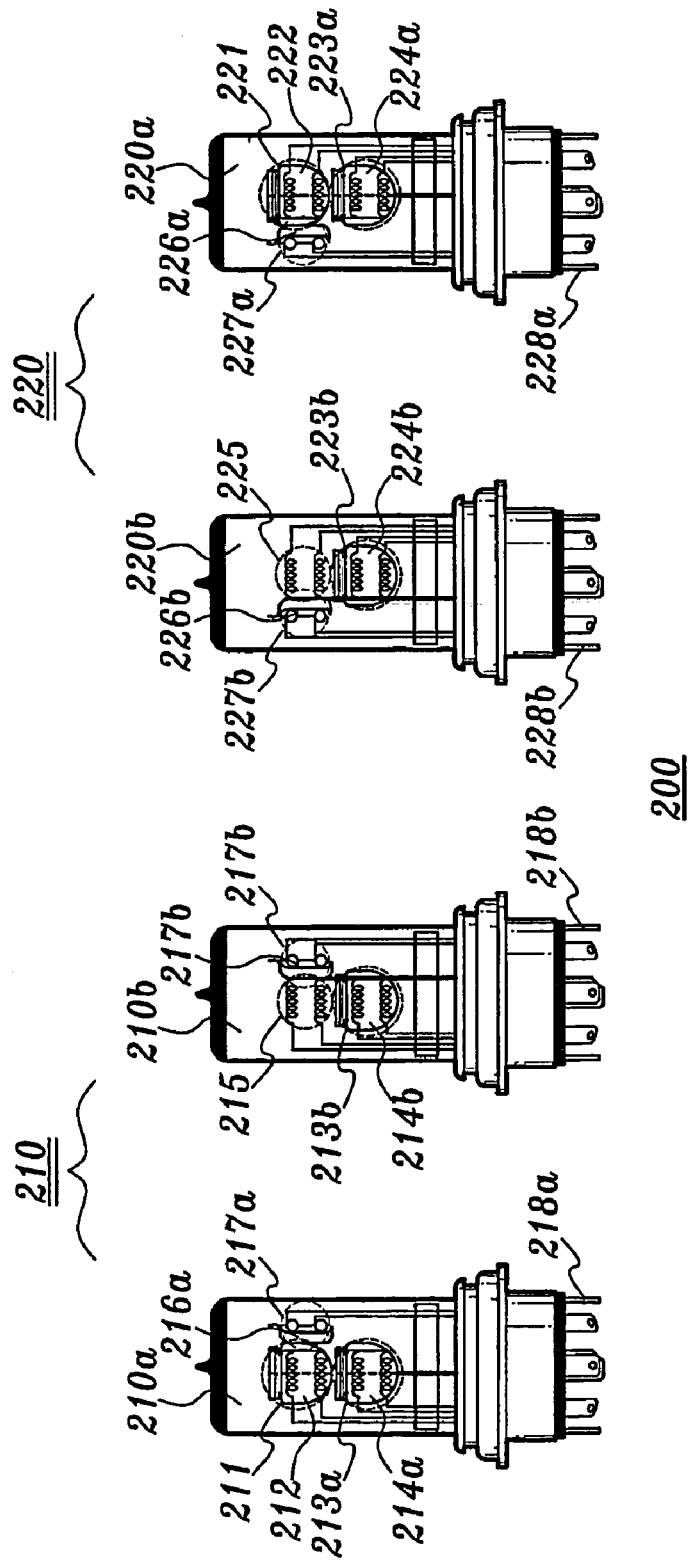
FIG. 2 is a view illustrating a separation type headlight lamp for a vehicle having a multifunction structure according to a preferred embodiment of the present invention.

FIG. 1 is a view illustrating an integral type headlight lamp for a vehicle having a multifunction structure according to a preferred embodiment of the present invention, and FIG. 2 is a view illustrating a separation type headlight lamp for a vehicle having a multifunction structure according to a preferred embodiment of the present invention.

As shown in FIGS. 1 and 2, the multifunction structure adapted to a headlight of a vehicle according to the present invention is classified into an integration type 100 and a separation type 200. The lamp of the headlight having different structural features may be classified into a left headlight lamp 110, 210 and a right headlight lamp 120, 220.

As shown in FIG. 1, the integration type left headlight lamp 110 and the integration type right headlight lamp 120 each have a plurality of high angle headlight filaments (HL) 115, 125, a plurality of middle angle headlight filaments (ML) 113, 123, and a plurality of low angle headlight filaments (LL) 111, 121.

The high angle headlight filament (HL) 115, 125, the middle angle headlight filament (ML) 113, 123 and the low angle headlight filament (LL) 111, 121 are adapted to emitting light and to provide a vehicle with high, middle and low angle beams. The low angle headlight filament (LL) 111, 121 and the middle angle headlight filament (ML) 113, 123 each have a conical reflection cover 112/122, 114/124 capable of adjusting an emitting light at low and middle angle beam pattern angles.

As shown in FIG. 1, the integration type left headlight lamp 110 and the integration type right headlight lamp 120 each have more than at least one steering headlight filament (SL) 117, 127.

More than at least one steering headlight filament (SL) 117, 127 each have a conical reflection cover 116, 126 for adjusting an emitting light at a steering beam pattern angle for providing a steering angle in one direction between the left and right directions with respect to the vehicle that is intended to turn left or right.

The integration type left headlight lamp 110 and the integration type right headlight lamp 120 each include one common connection terminal, and external connection terminals 118, 128 corresponding to a plurality of high, middle, low and steering angle headlight filaments 115/125, 113/123, 111/121, 117/127, so that the filaments are separately controlled.

As shown in FIG. 1, the integration type left headlight lamp 110 and the integration type right headlight lamp 120 each include high, middle, low and steering angle headlight filaments 115/125, 113/123, 111/121, 117/127 by two, respectively. Namely, the integration type headlight lamp 100 includes eight filaments. Nine external connection terminals 118, 126 are provided including the common terminals.

As shown in FIG. 2, the separation type left headlight lamp 210 and the right headlight lamp 220 each include a plurality of high angle headlight filaments (HL) 215, 225, and a plurality of low angle headlight filaments (LL) 211, 221.

In the separation type headlight 200, the left and right headlight lamps 210, 220 include external connection terminals 218b, 228b corresponding to a plurality of high angle headlight filaments (HL) 215, 225 and a plurality of high angle headlight filaments (HL) 215, 225. In addition, there are provided a plurality of low angle headlight filaments (LL) 211, 221, conical reflection covers 212, 222 provided in the low angle headlight filaments (LL) 211, 221, and external connection terminals 218a, 228a corresponding to the low angle headlight filaments (LL) 211, 221. The low angle headlight lamps 210a, 220a are adapted to provide a low angle beam to the vehicle. The lamp is designed to provide high and low angle beams.

In addition, the left headlight lamp 210 and the right headlight lamp 220 each include middle angle headlight filaments (ML) 213a/223a, 213b/223b. More than at least one middle angle headlight filament (ML) 213a/223a, 213b/223b are provided in one lamp in the high angle headlight lamp 210 and the low angle headlight lamp 220 of the separation type headlight. FIG. 2 is a view illustrating the construction that the middle angle headlight filaments (ML) 213a/223a, 213b/223b are provided in each of the left and right headlight lamps 100b, 200b.

Therefore, the high angle headlight lamps 210a, 220a are capable of providing a beam at a proper angle among the beams from the low most angle to the middle angle based on the luminous intensity of the opponent vehicle headlight and the surrounding luminous intensity of the vehicle.

In the separation type headlight 200, there are provided more than at least one steering headlight filament (SL) 217a/227a, 217b/227b installed in one of the high angle headlight lamps 210b, 220b and the low angle headlight lamps 210a, 220a for thereby providing a steering beam to the vehicle. There are provided conical reflection covers 216a/226a, 216b/226b provided in the steering headlight filaments (SL) 217a/227a, 217b/227b for adjusting the beams from the steering headlight filaments (SL) 217a/227a, 217b/227b at a steering beam pattern angle. There are further provided external connection terminals 218a/228a, 218b/228b corresponding to more than at least one steering headlight filaments (SL) 217a/227a, 217b/227b.

As shown in FIG. 2, the high angle headlight lamps 210b, 220b and the low angle headlight lamps 210a, 220a are a separation type headlight lamp 200 that is formed of high and low angle headlight filaments 215/225, 211/222 by two, respectively, and steering headlight filaments 217a/227a, 217b/227b by two, respectively. The low angle headlight lamps 210a, 220a each include more than at least middle angle headlight filaments (ML) 213a/223a, 213b/223b. Therefore, the low angle headlight lamps 210a, 220a each include seven external connection terminals 218a/228a including the common terminals. The high angle headlight lamps 210b, 220b each include seven external connection terminals 218b/228b including the common terminal. Therefore, it is possible to separately control the filaments.

Figure 3:
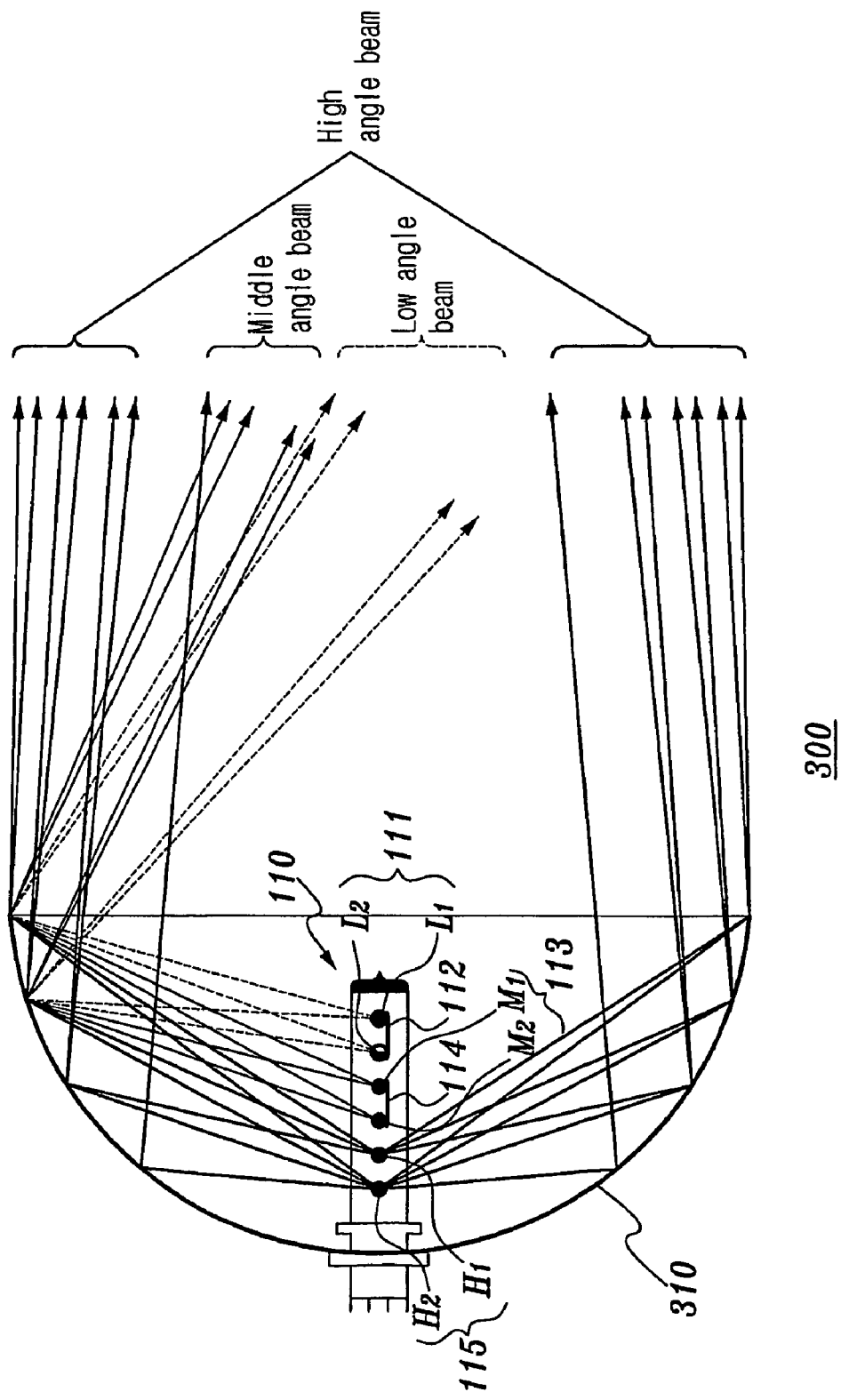
FIG. 3 is a view illustrating a beam pattern lighted through a reflection mirror of a headlight having an integration type headlight lamp according to a preferred embodiment of the present invention.
Figure 4:
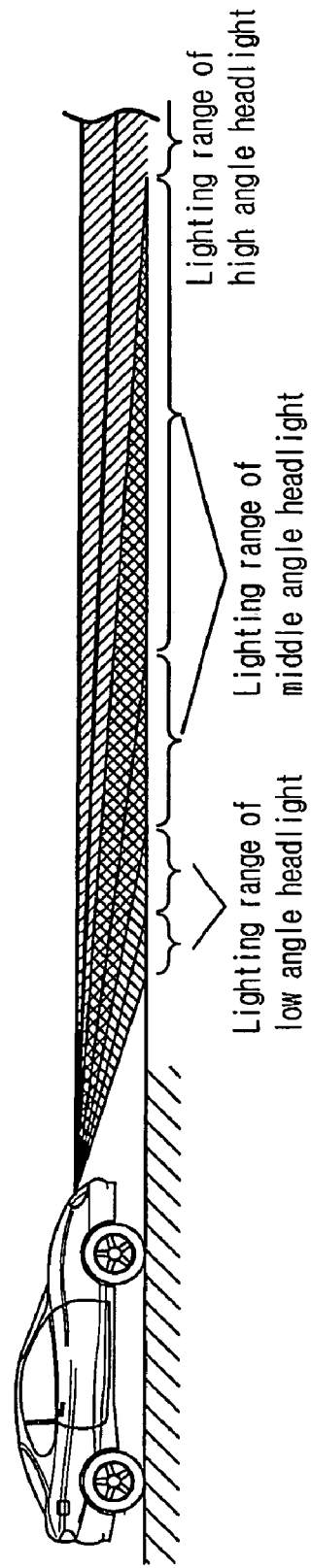
FIG. 4 is a view illustrating a lighting range based on a beam pattern of a headlight for a vehicle adapting a headlight lamp according to a preferred embodiment of the present invention.

FIG. 3 is a view illustrating a beam pattern lighted through a reflection mirror of a headlight having an integration type headlight lamp according to a preferred embodiment of the present invention, and FIG. 4 is a view illustrating a lighting range based on a beam pattern of a headlight for a vehicle adapting a headlight lamp according to a preferred embodiment of the present invention.

As shown in FIGS. 3 and 4, the headlight 300 adapting the headlight lamp having a multifunction structure according to the present invention has different beam pattern angles and is capable of lighting high, middle and low angle beams in different lighting ranges.

In the present invention, it is possible to control the headlight at various angles in the lighting ranges of high, middle and low angle headlights based on the running speed of the vehicle. The above construction and operation will be described in detail with reference to the headlight having the integration type headlight lamps of FIGS. 3 and 4 and Table 1.

As seen in Table 1, as the vehicle starts, and the speed of the vehicle is increased, the first filament L1 of the low angle headlight filaments (LL) 111 is turned on. As the speed of the vehicle is increased or decreased, the first filament L1 is turned on and off based on the six steps. The lighting angle of the headlight is automatically changed in proportion to the speed of the vehicle.

In the present invention, it is possible to control the headlight at various angles in the lighting range of high, middle and low angle headlights based on the luminous intensity of the opponent vehicle headlight while the vehicle runs. The above construction and operation will be described in detail with reference to the headlight having the integration type headlight lamp of FIGS. 3 and 4 and Table 2.

In a state that there is not an opponent vehicle (or in the case that a headlight of the opponent vehicle is not detected), the steps shown in Table 1 is directly adapted. As seen in Table 2, in the case that the luminous intensity of the opponent vehicle headlight is strongly detected, the lighting angle of the beam lighted in response to the speed of the vehicle is automatically adjusted to a low angle, so that it is possible to minimize the damages due to the high angle headlight that may affect the coming opponent vehicle.

Namely, according to a preferred embodiment of the present invention, a corresponding filament provided in the headlight lamp 110 emits light in response to the speed of the vehicle. The thusly emitted light is lighted as high, middle and low angle beams through the reflection mirror 310. The beam pattern angles of the middle and low angle beams are adjusted by the reflection cover provided in the filament capable of emitting a corresponding light and are reflected by the reflection mirror 310 and are lighted as a beam at a corresponding angle.

A corresponding filament sub substituted with the filament emitting in response to the speed of the vehicle is provided in the headlight lamp in response to the luminous intensity of the headlight. The above light is lighted as a beam of a corresponding angle among the high, middle and low angle beams through the reflection mirror 310. The beam pattern angles of the middle and low angle beams are adjusted by the reflection covers 112, 114 provided in a filament capable of emitting a corresponding light, and the middle and low angle beams are reflected by the reflection mirror 310 and are lighted as a beam at a corresponding angle.

As shown in FIG. 3, the headlight 300 lights a high angle beam from the low angle beam through the middle angle beam as the speed of the vehicle is increased. The headlight lamp 110 has two the low, middle and high angle headlight filaments 111, 113 and 115 by two, respectively. In more detail, the filament provided above the head of the lamp among a pair of filaments provided in the headlight lamp 110 is first turned on in proportion to the speed of the vehicle.

As shown in FIG. 4, since the lighting angle of the headlight is automatically adjusted based on the speed of the vehicle, it is possible to provide a proper lighting range of the headlight based on the stop distance that is changed based on the speed of the vehicle to the driver.

In addition, even when one filament is disconnected, the other one filament is turned on based on the disconnection extra-structure and disconnection recovery program, so that it is possible to prevent a problem that the headlight is disconnected.

TABLE 1

| Vehicle speed | Low angle headlight (LL) | | Mid angle headlight (ML) | | High angle headlight (HL) | | steps |
|---|---|---|---|---|---|---|---|
| | L1 | L2 | M1 | M2 | H1 | H2 | |
| Stop | x | x | x | x | x | X | 0 |
| Low speed ↕ mid speed | ○ | x | x | x | x | X | 1 |
| | x | ○ | x | x | x | X | 2 |
| | x | x | ○ | x | x | X | 3 |
| | x | x | x | ○ | x | X | 4 |
| | x | x | x | x | ○ | X | 5 |
| | x | x | x | x | x | ○ | 6 |

TABLE 2

| Opponent vehicle headlight luminous intensity | Low angle headlight (LL) | | Mid angle headlight (ML) | | High angle headlight (HL) | | Steps |
|---|---|---|---|---|---|---|---|
| | L1 | L2 | M1 | M2 | H1 | H2 | |
| strong ↕ weak | ○ | x | x | x | x | X | 1 |
| | x | ○ | x | x | x | X | 2 |
| | x | x | ○ | x | x | X | 3 |
| | x | x | x | ○ | x | X | 4 |
| | x | x | x | x | ○ | X | 5 |
| | x | x | x | x | x | ○ | 6 |

Figure 5:
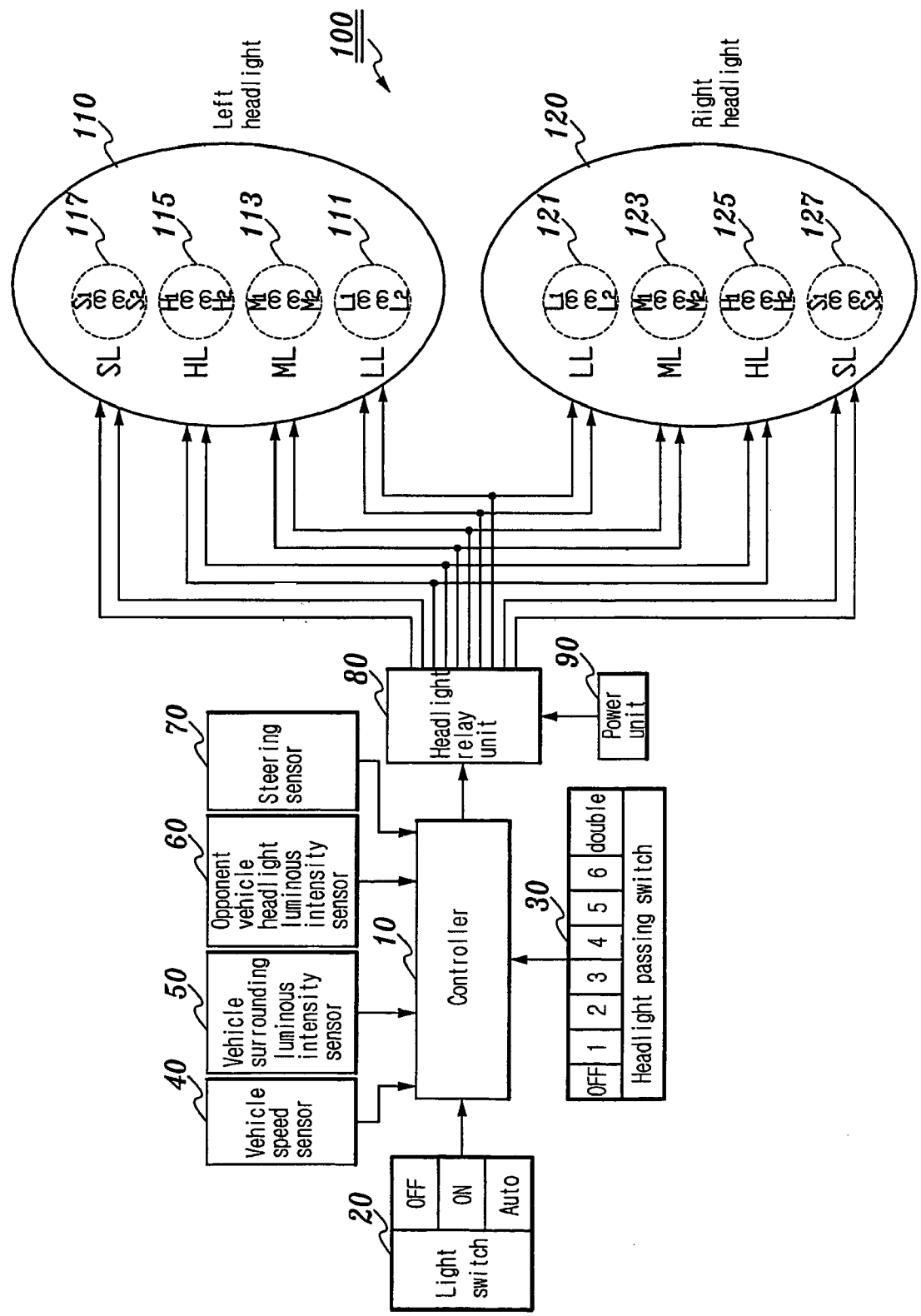
FIG. 5 is a view illustrating the construction of a control apparatus of a headlight according to a preferred embodiment of the present invention.

FIG. 5 is a view illustrating the construction of an apparatus for controlling a headlight according to a preferred embodiment. As shown therein, there are provided a controller 10, a light switch 20, a headlight passing switch 30, a vehicle speed sensor 40, a vehicle surrounding luminous intensity sensor 50, an opponent vehicle headlight luminous intensity sensor 60, a steering sensor 70, a headlight relay unit 80 and a power unit 90.

In the descriptions of an apparatus for controlling a headlight of a vehicle of FIG. 5, since the integration type headlight lamp 100 of FIG. 1 and the separation type headlight lamp 200 of FIG. 2 are same in their basic principles, the integration type left headlight 110 and the right headlight 120 of FIG. 110 will be described as one example.

The apparatus for controlling the headlight of a vehicle according to the present invention includes left and right headlight lamps 110 and 120 each having a multifunction structure formed of a plurality of high, middle and low angle headlight filaments (HL, ML, LL) 115/125, 113/123, 111/121 which are capable of emitting light for providing high, middle and low angle beams, respectively. In addition, there are provided a plurality of steering headlight filaments (SL) 117, 127 capable of selectively providing a steering beam based on a steering direction of a vehicle for thereby providing a light in a forward and lateral direction of a vehicle.

The light switch 20 is capable of providing an auto mode (Auto) to a driver for automatically turning on and off a headlight and automatically converting a lighting angle of the headlight. In the case that the driver wants to automatically change the lighting angle and lighting luminous intensity of the headlight 300 based on the surrounding luminous intensity of the vehicle and the luminous intensity of the opponent vehicle headlight, the light switch 20 is switched to the auto mode, and in the case that the driver wants to manually operate, the light switch 20 is switched to on.

When the manual mode (On-position) is selected from the light switch 20, the headlight passing switch 30 turns on one filament among the high, middle and low angle headlight filaments 115/125, 113/123, 111/121, so that the driver of a vehicle is provided with the headlight turning on steps for thereby lighting one of the high, middle and low angle beams.

As shown in FIG. 5, the headlight passing switch 30 has the step 0 (corresponding to off) and the steps 1 through 6, so that the lightning angle of the headlight is changed based on the speed of the vehicle and the luminous intensity of the opponent vehicle headlight as shown in Tables 1 and 2.

In addition, as shown in Table 3, the headlight passing switch 30 has a double mode so that the luminous intensity of the headlight is changed in proportion to the surrounding high and low luminous intensities of the vehicle.

TABLE 3

| Surrounding luminous intensity | Low angle headlight (LL) | | Mid angle headlight (ML) | | High angle headlight (HL) | | Steps |
|---|---|---|---|---|---|---|---|
| | L1 | L2 | M1 | M2 | H1 | H2 | |
| Day time and similar luminous intensity | x | x | X | x | x | X | 0 |
| High ↕ low | ○ | x | X | x | x | X | 1 |
| | ○ | ○ | X | x | x | X | 2 |
| | X | x | ○ | x | x | X | 3 |
| | x | x | ○ | ○ | X | X | 4 |
| | x | x | X | x | ○ | X | 5 |
| | x | x | X | x | ○ | ○ | 6 |

As shown in Table 3, the high, middle and low angle headlight filaments 115/125, 113/123, 111/121 are turned on and off based on the six steps as the surrounding luminous intensity of the vehicle is decreased. The lighting luminous intensity is automatically changed in proportion to the luminous intensity of the surrounding of the vehicle. In a preferred embodiment of the present invention, as the surrounding luminous intensity of the vehicle is decreased, the headlight is sequentially turned on and off from the low angle headlight 111/121 to the high angle headlight 115/125 through the middle angle headlight 113/123.

Since the headlight lamp 100 includes two low, middle and high headlight filaments 111/121, 113/123, 115/125, it is possible to provide the luminous intensity increased tow times in the low, middle and high angle headlights 111/121, 113/123, 115/125 by turning on a pair of filaments provided in the headlight lamp of FIG. 1 in proportion to the surrounding luminous intensity of the vehicle.

Therefore, in the present invention, since the lighting luminous intensity of the headlight is automatically adjusted based on the surrounding luminous intensity of the vehicle, it is possible to provide a driver with a better visibility.

In addition, the double mode is provided in the headlight passing switch 30. When the low, middle and high angle headlights 111/121, 113/123, 115/125 are turned on, two times luminous intensity that the driver wants to light is obtained (for example, in the case that the low angle headlight is turned on, L1 and L2 are concurrently turned on, and in the case that the middle headlight is turned on, M1 and M2 are concurrently turned on, and in the case that the high angle headlight is turned on, H1 and H2 are concurrently turned on). Therefore, it is possible to obtain a good visibility even when the driver drives a vehicle in a bad weather condition like a rainy night in which a driver's visual field is very bad or even when a night blindness driver drives a vehicle having a common vacuum lamp or a halogen lamp.

When the automatic mode is selected from the light switch 20, the vehicle speed sensor 40 detects a running speed of the vehicle and generates a vehicle speed signal corresponding to the detected vehicle speed and transfers to the controller 10.

The vehicle surrounding luminous intensity sensor 50 detects the level of the surrounding luminous intensity of the vehicle and transfers a luminous intensity signal corresponding to the detected level of the luminous intensity to the controller 10.

When the automatic mode is selected from the light switch 20, the opponent vehicle headlight luminous intensity sensor 60 detects the opponent vehicle headlight luminous intensity of the vehicle and transfers a luminous intensity signal corresponding to the detected opponent vehicle luminous intensity to the controller 10.

The steering sensor 70 detects a steering state of the vehicle and transfers a steering signal corresponding to the detected steering direction to the controller 10. When the vehicle is intended to turn in a certain direction, the steering sensor 70 detects the proceeding direction of the vehicle when the rotational angle of the handle exceeds a certain angle.

The controller 10 determines a lighting step of the headlight based on the vehicle speed signal from the vehicle speed sensor 40 and an acceleration of the vehicle speed signal and controls in such a manner that a corresponding headlight filament among the high, middle and low angle headlight filaments 115/125, 113/123, 111/121 is turned on based on the determined lighting step.

The controller 10 determines the lighting step of the headlight based on a luminous intensity signal from the opponent vehicle headlight luminous intensity sensor 60. A corresponding new headlight filament is turned on based on a luminous intensity signal from the opponent vehicle headlight luminous intensity sensor 60 with respect to a corresponding headlight filament turned by the luminous intensity signal from the vehicle speed sensor 40.

The controller 10 determines the lighting step of the headlight based on the luminous intensity signal from the vehicle surrounding luminous intensity sensor 50 and controls in such a manner that one or all of the high, middle and low angle headlight filaments of a corresponding lighting step are turned on based on the determined lighting step.

The controller 10 determines a steering direction of the vehicle based on a steering signal from the steering sensor 70 and controls in such a manner that the steering headlight filaments 117, 127 of a corresponding direction in the steering headlight filaments 117, 127 are turned on based on the determined steering direction.

The headlight relay unit 80 supplies a power to a corresponding headlight filament selected based on a lighting step determined in accordance with the vehicle speed signal and luminous intensity signal among the high, middle and low angle headlight filaments 115/125, 113/123, 111/121 in accordance with a control of the controller 10 and supplies a power to the steering headlight filaments 117, 127 of a corresponding direction based on the steering signal among the steering headlight filaments 117, 127.

The power unit 70 is directed to supply a power to each element of the vehicle.

Figure 6A:
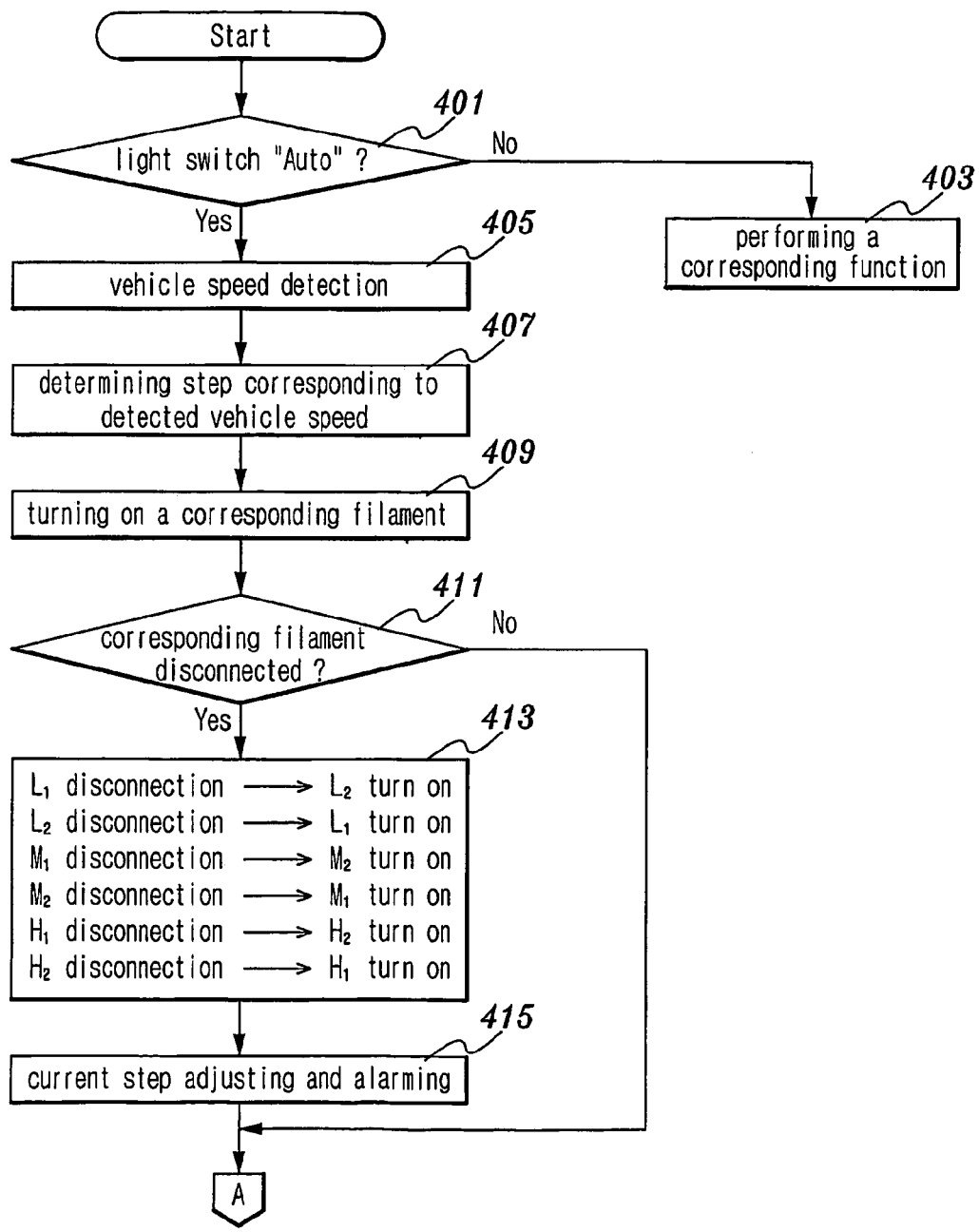
FIG. 6A is a flow chart of a control method of a headlight for turning on a corresponding filament of a headlight in response to a speed of a vehicle according to a preferred embodiment of the present invention.
Figure 6B:
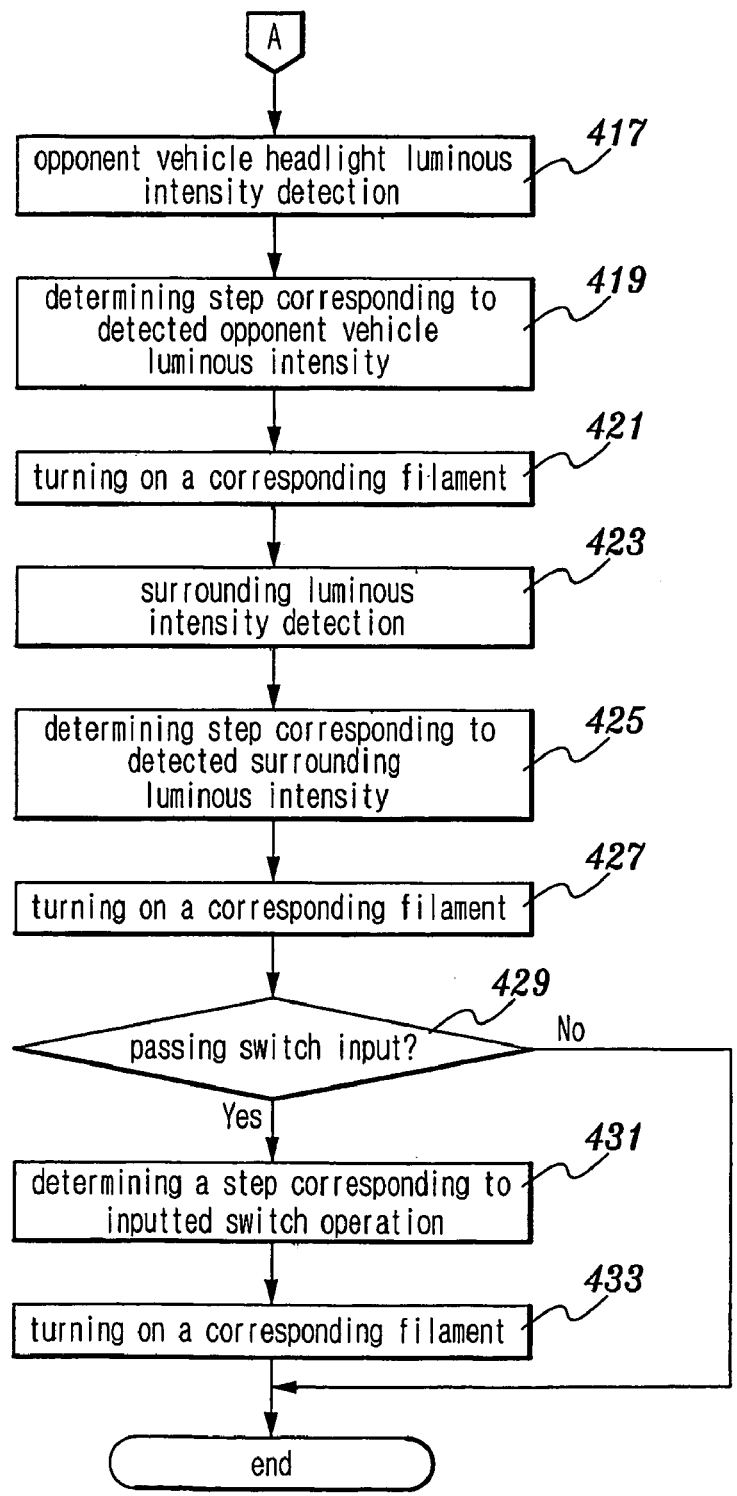
FIG. 6B is a flow chart of a control method of a headlight for turning on a corresponding filament of a headlight in response to a surrounding luminous intensity of a vehicle and a luminous intensity of an opponent vehicle headlight according to a preferred embodiment of the present invention.

FIG. 6A is a flow chart of a control method of a headlight for turning on a corresponding filament of a headlight in response to a speed of a vehicle according to a preferred embodiment of the present invention, and FIG. 6B is a flow chart of a control method of a headlight for turning on a corresponding filament of a leadlight in response to a surrounding luminous intensity of a vehicle and a luminous intensity of an opponent vehicle headlight according to a preferred embodiment of the present invention.

Figure 7:
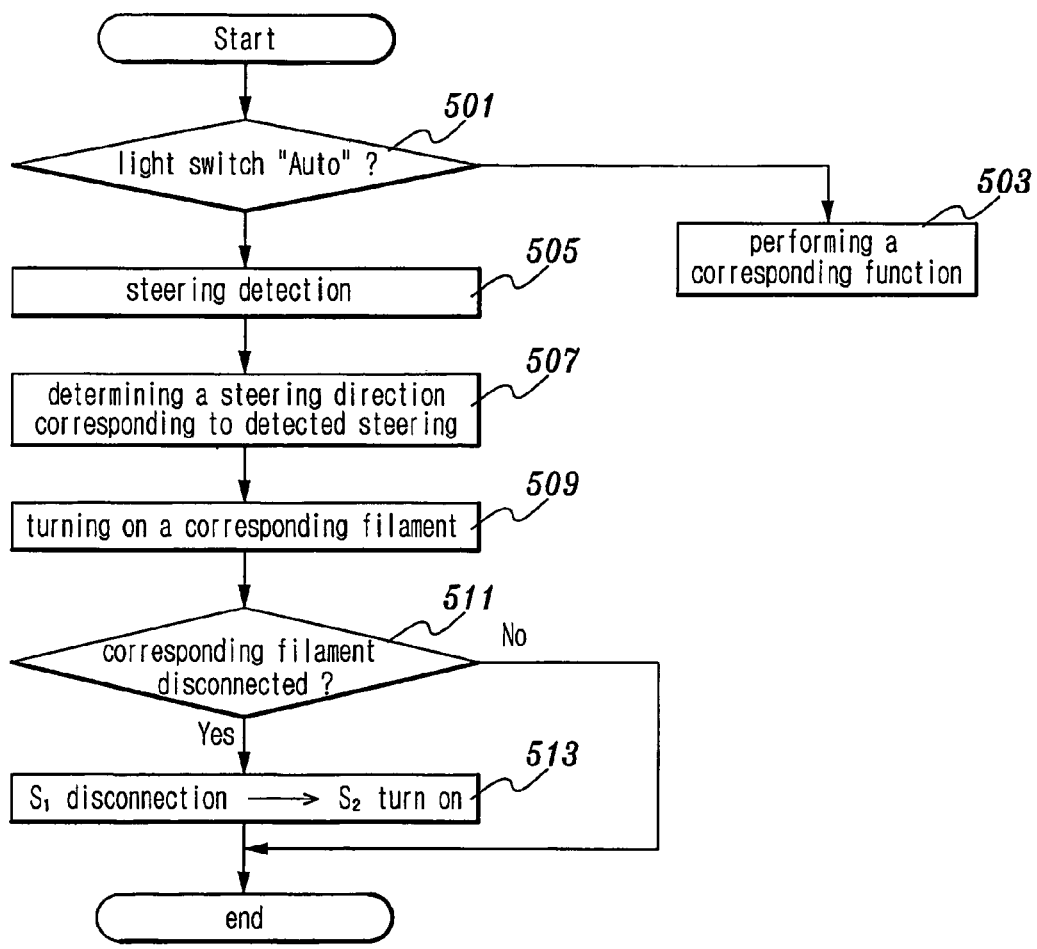
FIG. 7 is a flow chart of a control method of a headlight turned on based on a steering direction of a vehicle according to a preferred embodiment of the present invention

In addition, FIG. 7 is a flow chart of a control method of a headlight turned on based on a steering direction of a vehicle according to a preferred embodiment of the present invention.

The headlight control method of a vehicle according to the present invention will be described with reference to FIGS. 1 through 7.

The control method of the headlight of a vehicle that includes at least one between the headlight lamps 100a, 200a providing the multifunction structure in an integration type of FIG. 1 and the headlight lamps 100b, 200b providing the multifunction structure in a separation type of FIG. 2 will be described as follows.

As shown in FIG. 6A, in Step 401, the controller 10 of FIG. 5 judges a state that a vehicle driver adjusts the light switch of FIG. 5 to the automatic mode and performs the headlight automatic control mode.

In Step 405, the controller 10 drives the vehicle speed sensor 40 for thereby detecting the running speed of the vehicle. In Step 407, the controller 10 determines the lighting step corresponding to the detected speed of the vehicle in accordance with a vehicle speed signal from the vehicle speed sensor 40. The lighting steps based on the speed of the vehicle are shown in Table 1.

In Step 409, the controller 10 controls the headlight relay unit 80 so that a corresponding filament among the high, middle and low angle headlight filaments is turned on in accordance with the determined lighting step.

In Step 411, the controller 10 judges whether a corresponding filament is disconnected when the filament is turned on based on the determined lighting step in accordance with the speed of the vehicle. In Step 413, when a corresponding filament is disconnected, the controller 10 changes the filament with a previously designated filament, and the designated filament is turned on.

In Step S415, the controller 10 adjusts the current lighting step and alarms that a corresponding filament is disconnected, and the routine goes to Step 417 of FIG. 6b.

In Step 417, the controller 10 drives the opponent vehicle headlight luminous intensity sensor 60 and detects the opponent vehicle headlight luminous intensity of then vehicle.

In Step 419, the controller 10 determines the lighting step corresponding to the detected opponent vehicle headlight luminous intensity from a luminous intensity signal from the opponent vehicle headlight luminous intensity sensor 60. The lighting steps based on the opponent vehicle headlight luminous intensity are shown in Table 2.

In Step 421, the controller 10 turns on a corresponding filament among the high, middle and low angle headlight filaments based on the determined lighting step.

In Step 423, the controller 10 drives the vehicle surrounding luminous intensity sensor 50 and detects the luminous intensity of the surrounding of the vehicle. In Step 425, the controller 10 determines the lighting step corresponding to the detected luminous intensity based on a luminous intensity signal from the vehicle surrounding luminous intensity sensor 50. The lighting steps based on the luminous intensities are shown in Table 3.

In Step 417, the controller 10 controls the headlight relay unit 80 for turning on a corresponding filament among the high, middle and low angle headlight filaments 115/125, 113/123, 111/121 in accordance with the determined lighting step.

In Step 429, the controller 10 judges whether there is an input of the headlight passing switch 30 by a vehicle driver. When there is an input of the headlight passing switch 30, the routine goes to Step 431, and the lighting steps corresponding to the inputted switch operation are determined.

In Step 433, the controller 10 controls the headlight relay unit 80 for turning on a corresponding filament among the high, middle and low angle headlight filaments 115/125, 113/123, 111/121 based on the determined lighting step.

The controller 10 lights the lateral side of the vehicle using more than at least one steering headlight filament (SL) 117, 127 selectively provided together with the high angle headlight filament (HL) 115/125, the middle angle headlight filament (ML) 113/123, and the low angle headlight filament (LL) 111/121.

As shown in FIG. 7, in Step 501, the controller 10 performs the headlight automatic control mode when a vehicle driver adjusts the light switch 20 to the automatic mode.

In Step 505, the controller 10 drives the steering sensor 70 and detects a steering operation of the vehicle. In Step 507, the controller 10 judges the steering direction of the vehicle based on a steering signal from the steering sensor 70, and in Step 509, the controller turns on a corresponding filament corresponding to the steering direction among the steering headlight filaments 117, 127 based on the determined lighting step.

In Step 511, the controller 10 judges whether a corresponding filament is disconnected, and in Step 512, when the filament is disconnected, in Step 513, the disconnected filament is substituted with a previously designated filament for thereby implementing the turning on operation. In the case that one filament S1 is disconnected among the steering headlight filaments (SL) 117, 127, the other filament S2 is turned on.

As described above, the apparatus and method for controlling a headlight and a headlight lamp having a multifunction structure for the same according to the present invention are capable of automatically or manually changing the lighting angle of the vehicle headlight from the lowest angle to the highest angle (or horizontal angle) in proportion to the running speed of the vehicle and an acceleration of the running speed.

In addition, the apparatus and method for controlling a headlight and a headlight lamp having a multifunction structure for the same according to the present invention are capable of automatically and manually changing the lighting angle of the vehicle headlight from the high angle to the low angle in response to the luminous intensity of the opponent vehicle headlight, so that it is possible to decrease a damage that the high and middle angle beams lighted by the vehicle may affect the safety operation of the opponent vehicle.

The apparatus and method for controlling a headlight and a headlight lamp having a multifunction structure for the same according to the present invention are capable of automatically or manually increasing or decreasing the luminous intensity of the headlight by the multiple steps from a reference luminous intensity step to the maximum luminous intensity step based on a night visual field perception degree that a vehicle driver visually perceives based on a road condition in the night or in a state that the headlight is turned on.

Namely, the apparatus and method for controlling a headlight and a headlight lamp having a multifunction structure for the same according to the present invention are capable of increasing the luminous intensity of the headlight more than two times the standard luminous intensity. In addition, there are provided a disconnection extra-structure and a disconnection recovery program so that the lamp of the headlight is stably operated even when the filament of the headlight lamp is disconnected.

The apparatus and method for controlling a headlight and a headlight lamp having a multifunction structure for the same according to the present invention are capable of automatically lighting in the steering direction of the vehicle when the vehicle turns in a certain direction.

In the present invention, it is possible to provide a night blindness driver with a clearer visual field based on the changes of the weather condition. The lighting range of the headlight may be changed in proportion to the speed of the vehicle. The embodiments of the headlight according to the present invention may be implemented in various applications without departing from the scopes of the present invention such as fog light, guide light used for guiding landing and take-off of airplane, search light used at guard tower, a lighting lamp used in hospital operation room, HID (High Intensity Discharge) lamp, etc.

INDUSTRIAL APPLICABILITY

As described above, in the present invention, the luminous intensity of the light is adjusted based on the characteristic of the driver by lighting with a certain luminous intensity from a basic luminous intensity (12000 cd) to the maximum luminous intensity (115000 cd) complying with the vehicle safety standard of the conventional headlight. In the case that a vehicle driver drives in a bad weather condition in which it is impossible to clearly perceive a forward visual field based on the standard luminous rules, in the case that a vehicle driver drives in a sequestered road, or in the case that a night blindness driver drives in the night, it is possible to perceive a certain obstacle in the road for thereby implementing a safety driving based on the headlight according to the present invention.

In addition, in the present invention, the lighting angle is set in proportion to the stop distance within which a driver can do a certain action when meeting a certain obstacle in a forward direction in relation to the running speed of the vehicle which runs with a turned-on headlight. In the present invention, the stop distance and perception and reaction time of the driver are effectively adapted. The headlight beam pattern angle lighted based on the opponent vehicle headlight luminous intensity is automatically adjusted, so that the safety driving of the driver of the opponent vehicle is deeply considered.

In the present invention, it is possible to safely drive in the night by controlling the lighting direction of the headlight based on the steering direction of the vehicle. In the case that the low angle headlight filament most generally used among the headlights is disconnected, or in the case that the filament of the headlight lamp is unexpectedly disconnected, it is possible to quickly recover the disconnected problem during the driving. The traffic accident may be decreased by overcoming any inconvenience during the exchange of the headlight and the problem of the loss of the lighting function.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. In an apparatus for controlling a headlight for a vehicle having a headlight lamp of a multifunction structure having a plurality of high, middle and low angle and steering headlight filaments each capable of emitting light for providing high, middle and low angle and steering beams, an apparatus for controlling a headlight for a vehicle, comprising:
   a light switch capable of providing an automatic mode to a vehicle driver, said automatic mode capable of automatically changing an on and off time of the headlight and a lighting angle of the headlight;
   a vehicle speed sensor for detecting a running speed of a vehicle when an automatic mode is selected by the light switch and generating a vehicle speed signal corresponding to the detected vehicle speed;
   an opponent vehicle headlight luminous intensity sensor for detecting a luminous intensity of the opponent vehicle headlight of the vehicle when the automatic mode is selected by the light switch and generating a luminous intensity signal corresponding to the detected opponent vehicle luminous intensity;
   a vehicle surrounding luminous intensity sensor for detecting a surrounding luminous intensity of the vehicle when the automatic mode is selected by the light switch and generating a luminous intensity signal corresponding to the detected surrounding luminous intensity;
   a controller for determining a lighting step of the headlight in accordance with a vehicle speed, opponent vehicle headlight luminous intensity signal and vehicle surrounding luminous intensity signal from the vehicle speed sensor, the opponent vehicle headlight luminous intensity sensor and the vehicle surrounding luminous intensity sensor and controlling an operation that a corresponding filament among the high, middle and low angle headlight filaments is turned on based on the determined lighting step;
   a headlight relay unit for supplying a power to a corresponding selected filament based on the determined lighting step among the high, middle and low angle headlight filaments in accordance with a control of the controller; and
   a power unit for supplying a power to each element of the vehicle.

2. The apparatus according to claim 1, wherein said headlight lamp further comprises:
   low angle headlight reflection covers provided in the low angle headlight filaments, respectively, for thereby allowing the light from the low angle headlight filaments to have a low beam pattern angle; and
   external connection terminals corresponding to the high and low angle headlight filaments respectively.

3. The lamp of claim 2, further comprising:
   middle angle headlight reflection covers provided in the middle angle headlight filaments, respectively, for thereby allowing the light from the middle headlight filaments to have a middle beam pattern angle; and
   external connection terminals corresponding to the middle angle headlight filaments, respectively.

4. The lamp of claim 2, further comprising:
   more than at least one said steering headlight filament providing a steering beam in one direction between left and right directions to the vehicle;
   steering headlight reflection covers provided in the steering headlight filaments, respectively, for thereby allowing the light from the steering headlight filaments to have a steering beam pattern angle; and
   external connection terminals corresponding to each of more than at least one steering headlight filament, respectively.

5. The apparatus according to claim 2, said headlight lamp comprising:
   a plurality of high angle headlight lamps each formed of a plurality of said high angle headlight filaments and external connection terminals corresponding to the high angle headlight filaments for thereby providing a high angle beam to the vehicle; and
   a plurality of low angle headlight lamps each including a plurality of low angle headlight filaments, a plurality of low angle headlight reflection covers provided in the low angle headlight filaments, and a plurality of external connection terminals corresponding to the low angle headlight filaments, for thereby providing a low angle beam to the vehicle.

6. The lamp of claim 5, wherein said high angle headlight lamps each include:
   more than at least one said steering headlight filament capable of emitting light for providing a steering beam to the vehicle;
   steering headlight reflection covers provided in the steering headlight filaments for allowing the light from the steering headlight filaments to have a steering beam pattern angle; and
   external connection terminals corresponding to the steering headlight filaments, respectively.

7. The lamp of claim 5, wherein said low angle headlight lamps each include:
   more than at least one steering headlight filament capable of emitting light for providing a steering beam to the vehicle; steering headlight reflection covers provided in the steering headlight filaments for allowing the light from the steering headlight filament to have a steering beam pattern angle; and
   external connection terminals corresponding to the steering headlight filaments, respectively.

8. The lamp of claim 5, wherein said high angle headlight lamps each include:
   more than at least one middle headlight filament capable of emitting light for providing a middle angle beam to the vehicle;

middle angle headlight reflection covers provided in the middle headlight filaments for allowing the light from the middle angle headlight filaments to have a middle angle beam pattern angle; and external connection terminals corresponding to the middle steering headlight filaments, respectively.

9. The lamp of claim 5, wherein said low angle headlight lamps each include:

more than at least one middle angle headlight filament capable of emitting light for providing a middle angle beam to the vehicle;

middle angle headlight reflection covers provided in the middle headlight filaments for allowing the light from the middle angle headlight filaments to have a middle angle beam pattern angle; and external connection terminals corresponding to the middle angle headlight filaments, respectively.

10. The apparatus of claim 1, further comprising:

a steering sensor for detecting a steering state of the vehicle and generating a steering signal corresponding to the detected steering direction;

a controller for determining a steering direction of the vehicle based on a steering signal from the steering sensor and controlling an operation that the steering headlight filaments of a corresponding direction among the steering headlight filaments is turned on in accordance with the determined steering direction; and a headlight relay unit for supplying a power to the steering headlight filaments of a corresponding direction determined in accordance with the steering signal among the steering headlight filaments.

11. The apparatus of claim 1, further comprising a headlight passing switch for turning on a certain filament among the high, middle and low angle headlight filaments based on a driver's operation when the manual mode of the light switch is selected and for lighting a beam having a corresponding angle to the vehicle.

12. In a method for controlling a headlight of a vehicle using headlight lamps each having a multifunction structure having high, middle, low and steering angle headlight filaments capable of emitting light for providing high, middle, low and steering beams, a method for controlling a headlight of a vehicle, comprising the steps of: a step for performing a headlight automatic mode in such a manner that a vehicle driver adjusts a light switch;

a step for detecting a running speed of the vehicle by driving a vehicle speed sensor;

a step for determining a lighting step corresponding to the detected vehicle speed from a vehicle speed signal from the vehicle speed sensor;

a step for turning on a corresponding filament among the high, middle and low angle headlight filaments in accordance with the determined lighting step;

a step for detecting an opponent vehicle headlight luminous intensity of the vehicle by driving an opponent vehicle headlight luminous intensity sensor;

a step for determining a lighting step corresponding to the detected opponent vehicle headlight luminous intensity from a luminous intensity signal from the opponent vehicle headlight luminous intensity sensor;

a step for turning on a corresponding filament among the high, middle and low angle headlight filaments in accordance with the determined lighting step;

a step for detecting the surrounding luminous intensity of the vehicle by driving a vehicle surrounding luminous intensity sensor;

a step for determining a lighting step corresponding to the detected vehicle surrounding luminous intensity from a luminous intensity signal from the vehicle surrounding luminous intensity sensor; and a step for turning on a corresponding filament among the high, middle, and low angle filament in accordance with the determined lighting step.

13. The method of claim 12, further comprising:

a step for detecting a steering state of the vehicle by driving a steering sensor;

a step for determining a steering direction of the vehicle from a steering signal from the steering sensor; and a step for turning on a corresponding filament corresponding to the steering direction among the steering headlight filaments in accordance with the determined lighting step.

14. The method of claim 12, further comprising: a step for judging whether a corresponding filament is disconnected among the high, middle and low angle headlight filaments in accordance with the determined lighting step in accordance with a vehicle speed signal, an opponent vehicle headlight luminous intensity signal and a vehicle surrounding luminous intensity signal from the vehicle speed sensor, an opponent vehicle headlight luminous intensity sensor and a vehicle surrounding luminous intensity sensor;

a step for substituting the disconnected filament with a previously designated filament when the corresponding filament is disconnected and turning on the filament; and a step for adjusting the current lighting step and alarming a state that the corresponding filament is disconnected.

15. The method of claim 12, further comprising the steps of:

a step for judging whether there is an input of the headlight passing switch by a vehicle driver;

a step for determining the lighting step corresponding to the inputted switch operation when there is an input of the headlight passing switch; and a step for turning on a corresponding filament among the high, middle and low angle headlight filaments in accordance with the determined lighting step.

* * * * *